US006790345B2

(12) United States Patent
Broussard (10) Patent No.: US 6,790,345 B2
(45) Date of Patent: Sep. 14, 2004

(54) UNDERWATER FILTRATION OPERATOR (76) Inventor: Ronney L. Broussard, P.O. Box 490, Pollock, LA (US) 71467

( * ) Notice: Subject to any disclaimer, the term of this patent is extended or adjusted under 35 U.S.C. 154(b) by 39 days.

(21) Appl. No.: 10/194,645

(22) Filed: Jul. 12, 2002

(65) Prior Publication Data
US 2003/0010691 A1 Jan. 16, 2003

Related U.S. Application Data
(60) Provisional application No. 60/305,538, filed on Jul. 16, 2001.

(51) Int. Cl.[7] .............................. B01D 29/08; E03B 3/04
(52) U.S. Cl. ....................... 210/122; 210/155; 210/162; 210/170; 210/209; 210/243; 210/274; 210/283; 210/289; 210/338; 210/416.1; 405/127
(58) Field of Search ................................. 210/122, 155, 210/162, 170, 209, 243, 274, 275, 283, 284, 285, 286, 338, 345, 416.1; 405/127

(56) References Cited

U.S. PATENT DOCUMENTS

| RE4,165 E | * | 10/1870 | Dewey et al. | 210/170 |
|---|---|---|---|---|
| 167,546 A | * | 9/1875 | Lefferts | 210/170 |
| 344,813 A | * | 7/1886 | Bull et al. | 405/127 |
| 364,599 A | * | 6/1887 | Morris | 210/286 |
| 623,782 A | * | 4/1899 | Hammett | 210/170 |
| 869,558 A | * | 10/1907 | Durbow | 210/283 |
| 882,030 A | * | 3/1908 | Traulsen et al. | 210/242.1 |
| 1,200,126 A | * | 10/1916 | Mitchell | 210/284 |
| 3,120,491 A | * | 2/1964 | Kincaid | 210/242.1 |
| 4,606,819 A | | 8/1986 | Colson | 210/122 |
| 4,643,836 A | | 2/1987 | Schmid | 210/795 |
| 4,657,672 A | | 4/1987 | Allen | 210/94 |
| 4,950,393 A | | 8/1990 | Goettl | 210/169 |
| 5,160,039 A | | 11/1992 | Colburn | 210/150 |
| 5,256,310 A | * | 10/1993 | Brooks | 210/170 |
| 5,445,111 A | * | 8/1995 | Smith | 405/127 |
| 5,549,828 A | | 8/1996 | Ehrlich | 210/602 |
| 6,027,639 A | | 2/2000 | Lenhart, Jr. et al. | 210/108 |

* cited by examiner

Primary Examiner—Christopher Upton
(74) Attorney, Agent, or Firm—John M. Harrison (57) ABSTRACT An underwater filtration operator which can be suspended in a river, lake, pond or other water body to filter water from the water body. The underwater filtration operator may be electrically charged to discharge impurities in the water body and increase filtering efficiency and the operator includes a housing having a selected configuration and divided into one or more filtration units, each of which includes a filter medium for filtering water from the water body. A pump is provided in the housing for receiving the filtered water from the filtration units and pumping the filtered water to a collection tank or dispenser or directly to an end user or to a reverse-osmosis water filtration unit for further filtration.

16 Claims, 8 Drawing Sheets

UNDERWATER FILTRATION OPERATOR

CROSS-REFERENCE TO RELATED APPLICATIONS

This application claims the benefit of copending U.S. Provisional Application Serial No. 60/305,538, filed Jul. 16, 2001.

BACKGROUND OF THE INVENTION

FIELD OF THE INVENTION

This invention relates to water filters and more particularly, to an underwater filtration operator which can be positioned in a water body to filter and disinfect water from the water body for drinking or other purposes. The underwater filtration operator includes a housing having a selected configuration and divided into multiple filtration units which receive water from the water body, each of which filtration units includes at least one filter element or medium for filtering the water. A pump is provided in the housing for pumping the filtered water to a suitable container or dispenser or to a reverse-osmosis filtration unit for further filtration, and a positive electrical charge may be applied to the housing or to an insulated outer screen to neutralize negatively charged impurities flowing through the filter media and improve filtration efficiency.

Treatment processes for filtering surface water have remained virtually unchanged for over half a century. Many surface water treatment plants utilize large settling basins, known as clarifiers, to settle out heavy solids from water prior to fine-screening the water, using rapid sand filters. Some of these treatment plants use a mixing chamber clarifier to separate the heavy solids from the water. Such a mixing chamber clarifier requires the introduction of polymers, lime, alum or other types of media into the water to be treated, which media bind particulate impurities in the water and fall with the bound impurities to the bottom of the mixing chamber. The filtered water, substantially devoid of the larger impurities, is then processed through horizontal sand filters which remove smaller impurities from the water. The sand filters must be periodically backwashed using large quantities of clean water because they repeatedly become clogged with the smaller particles that were not removed from the water during the clarification process. The fewer the particles removed during the clarification process, the more often the backwashing procedure must be repeated.

The foregoing types of surface water treatment plants are associated with many problems due to the nature of their operation. Numerous pumps and an expensive elaborate intake structure must be installed in the water supplies to conduct the water to the plants for treatment. Another problem involves the disposal of solids that are removed from the water. Formerly these solids, along with the chlorine, polymers, lime or other particulate binding media, were pumped back into the pre-filtered water from which they were removed. Due to recent environmental legislation, however, it is no longer lawful to discharge the particulate binding media into the pre-filtered water supply, as these materials are not endemic to the water that is being treated. Another problem associated with these filtration systems is that the polymers or other particle binding media introduced into the filtration system are harmful to certain types of boiler water industrial filtration and equipment which utilizes reverse osmosis. This increases the cost of boiler water for industrial consumers. Furthermore, disinfectant chemicals introduced into the filtered water do not always kill all parasites found in water sources. Furthermore, rapid sand filters cannot remove all of these parasites, some of which remain in the water and present a potentially dangerous health risk. Another problem associated with these surface water treatment plants is the inability to remove harmful chemicals which may contaminate the water supply by agricultural run-off or accidental spills. Accordingly, surface treatment plants can be costly and time-consuming to build and maintain.

A number of different types of filters are known in the art for filtering surface water. Patents of interest in this regard include U.S. Pat. No. 4,606,819, issued Aug. 19, 1986, to Colson; U.S. Pat. No. 4,643,836, issued Feb. 17, 1987, to Schmid; U.S. Pat. No. 4,657,672, issued Apr. 14, 1987, to Allen; U.S. Pat. No. 4,950,393, issued Aug. 21, 1990, to Goettl; U.S. Pat. No. 5,160,039, issued Nov. 3, 1992, to Colburn; U.S. Pat. No. 5,549,828, issued Aug. 27, 1996, to Ehrlich; and U.S. Pat. No. 6,027,639, issued Feb. 22, 2000, to J. Lenhart et al.

An object of this invention is to provide an underwater filtration assembly or operator capable of filtering water from a river, lake, pond or other water body.

Another object of this invention is to provide a self-contained underwater filtration operator which is simple in construction and operation and can be designed to float on the water body.

Yet another object of the invention is to provide an underwater filtration assembly or operator which is charged with electricity to neutralize negatively charged impurities flowing through the filter media in the operator and thereby improve filtration efficiency.

Still another object of this invention is to provide an underwater filtration operator device which includes a filter screen or screens that may be positively charged with electricity, multiple filtration units that may be negatively charged and are provided in the housing for receiving the water, at least one filter element or medium provided in each filtration unit for filtering the water and a pump provided in the housing for pumping the filtered water to a collection container or dispenser, or to a reverse osmosis filtration unit for further treatment.

A still further object of the invention is to provide a method of filtering water in a water body comprising the steps of providing a self-contained underwater filter operator having filter screens, placing the operator in a water body, providing a pump in the operator, optionally providing a positive charge on one or more of the filter screens or the insulated housing and pumping water through the filter and from the filter to an outside storage facility for further treatment.

SUMMARY OF THE INVENTION

These and other objects of the invention are provided in an underwater filtration assembly or operator and method of filtering water in a water body, which operator can be suspended in a lake, pond or other water body to filter water from the water body. The underwater filtration operator includes a housing having a selected configuration and enclosing multiple filtration units, each of which units includes at least one filter element or medium for filtering water from the water body. A pump is provided in the housing for receiving the filtered water from the filtration units and pumping the filtered water to a suitable collection facility or dispenser, or to a reverse osmosis filter for further treatment. An insulated outside filter grid or screen or the insulated housing in the operator may be positively charged with electricity to neutralize negatively charged impurities flowing through the filter media with the raw water and enhance the filtration efficiency.

BRIEF DESCRIPTION OF THE DRAWINGS

The invention will be better understood by reference to the accompanying drawings, wherein.

DESCRIPTION OF THE PREFERRED EMBODIMENTS

Figure 1:
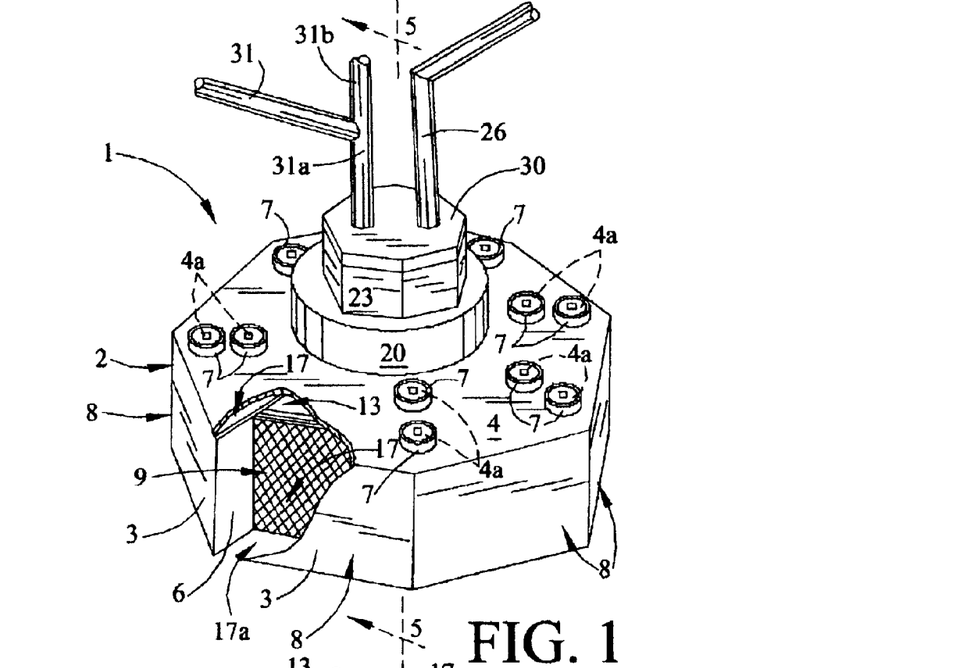
FIG. 1 is a perspective view, partially in section, of a first illustrative embodiment of the underwater filtration operator of this invention.
Figure 2:
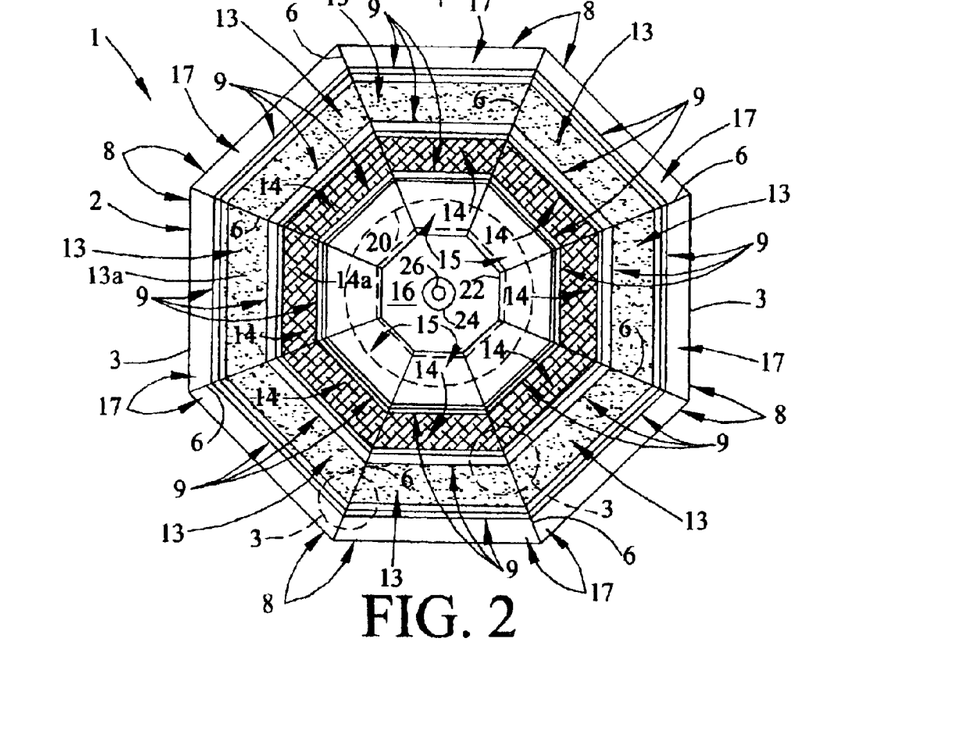
FIG. 2 is a top view, with the top housing panel element removed, of the underwater filtration operator illustrated in FIG. 1.
Figures 3, 4, 5:
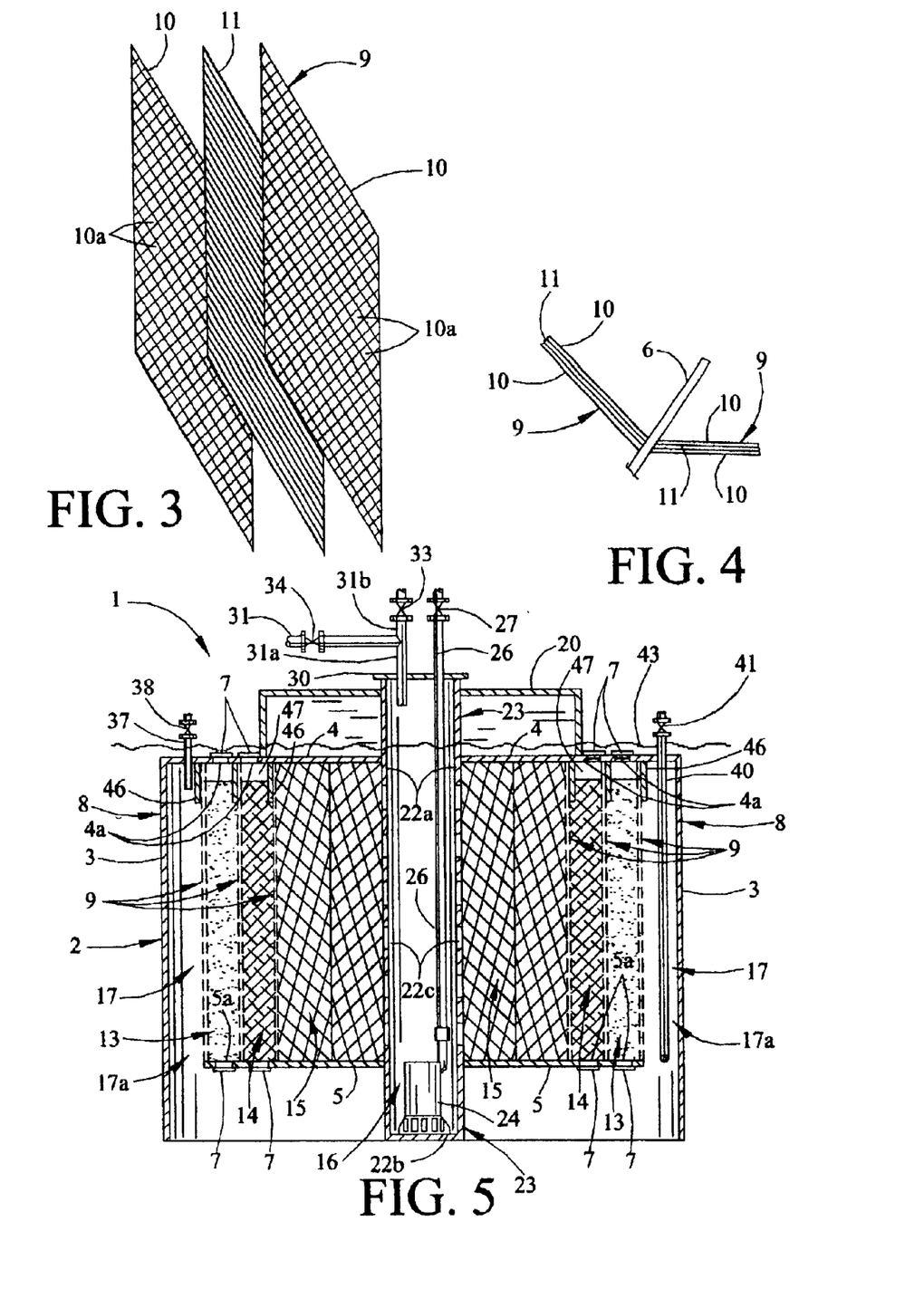
FIG. 3 is an exploded, perspective view of a typical screen grid element of the underwater filtration operator.
FIG. 4 is a sectional view, taken along section line 3 in FIG. 2, of a connecting segment of a typical underwater filtration operator.
FIG. 5 is a sectional view, taken along section lines 5—5 in FIG. 1, of the underwater filtration operator, with the bottom removed for brevity.
Figure 6:
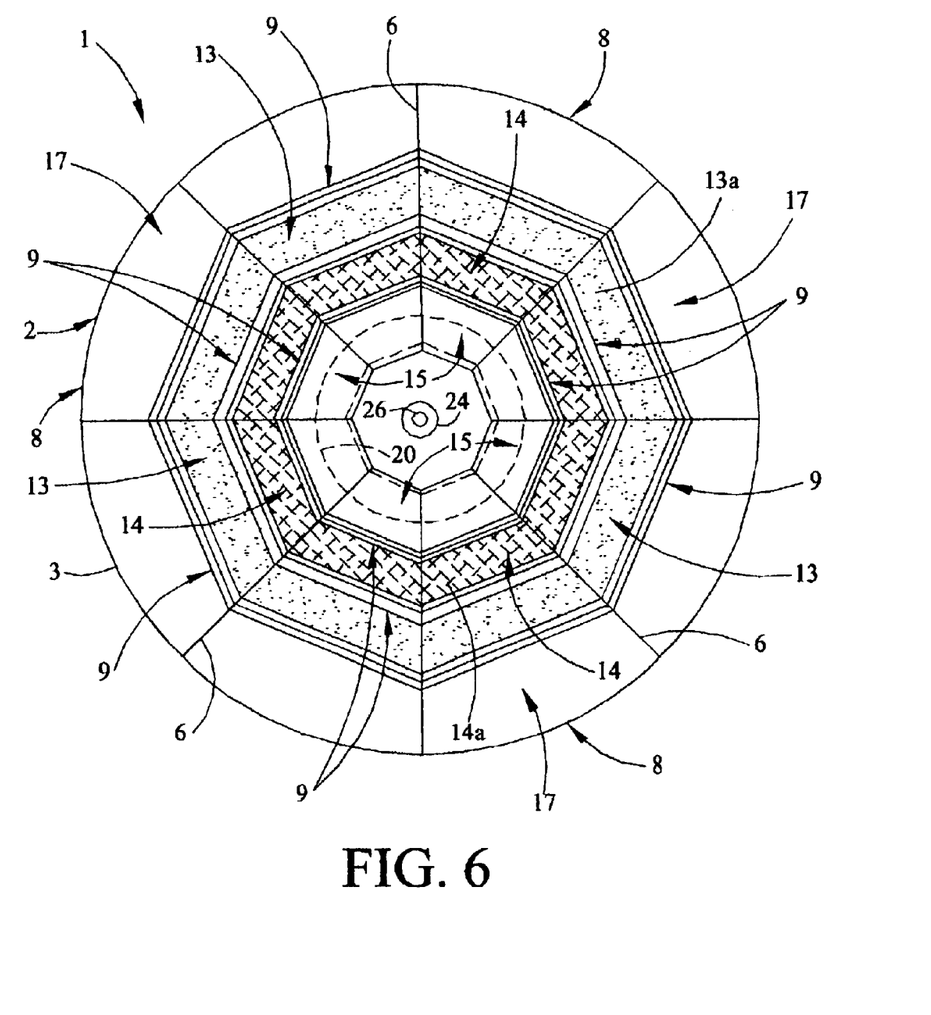
FIG. 6 is a top view, with the top housing panel element removed, of another embodiment of the underwater filtration operator, illustrating an alternative configuration for the housing of the underwater filtration operator.
Figure 7:
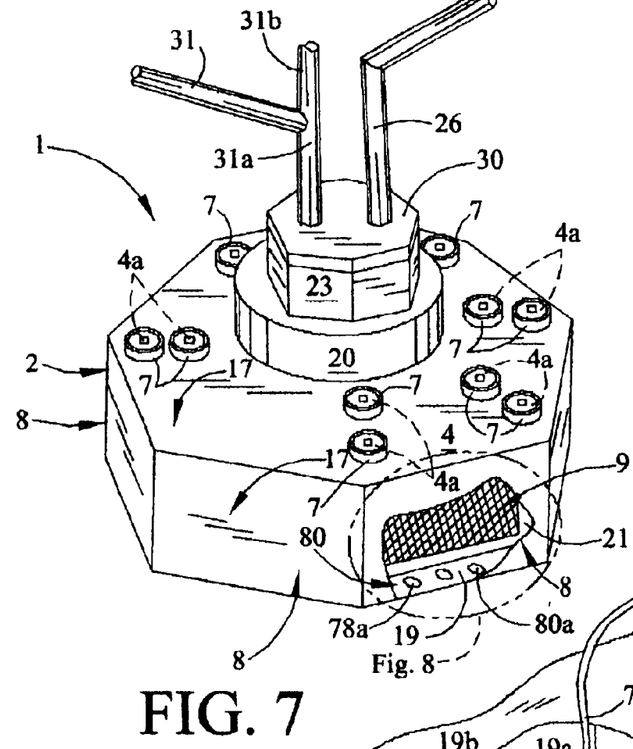
FIG. 7 is a perspective view of an alternative positively charged water inlet screen embodiment of the underwater filtration operator illustrated in FIG. 1.
Figure 8:
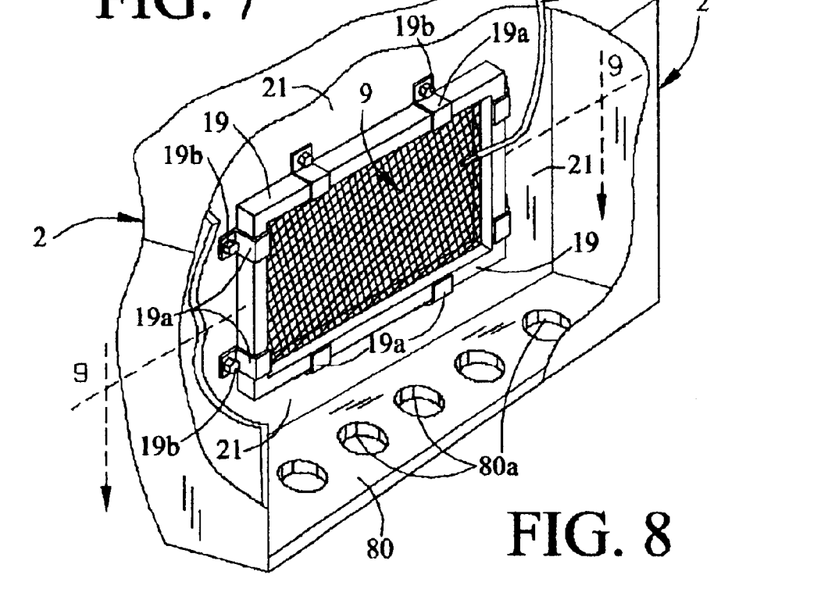
FIG. 8 is an enlarged perspective view of a typical positively charged water inlet screen for the underwater filter operator illustrated in FIG. 7.

Referring initially to FIGS. 1–6 of the drawings, an illustrative embodiment of the underwater filtration operator of this invention is generally illustrated by reference numeral 1. The underwater filtration operator 1 is designed for floatation or otherwise positioning in a water body 43 (FIG. 5), such as a river, pond or lake to filter and disinfect water from the water body 43 for drinking or other purposes, as hereinafter described. In a first preferred embodiment the underwater filtration operator 1 includes a housing 2 which, as illustrated in FIGS. 1 and 2, can be octagonal in shape or alternatively, cylindrical, as illustrated in FIG. 6 or any other suitable shape. The housing 2 includes an outer wall 3, and has a top housing panel 4 and a bottom housing filter panel 5 (FIG. 5), as well as a bottom 80, as illustrated in FIGS. 7 and 8. The housing 2 encloses multiple filtration units 8, separated from each other in the housing 2 by means of partitions 6 which extend from the outer wall 3 and between the top housing panel 4 and the bottom housing panel 5. While the embodiment of the underwater filtration operator 1 illustrated in the drawings includes eight filtration units 8, it is understood that any number of filtration units 8 can be contained in a housing 2 of any desired size and shape. As illustrated in FIGS. 2 and 6, each filtration unit 8 typically includes an outermost raw water chamber 17, separated from an outer filter chamber 13 by means of an outer screen grid 9. The outer filter chamber 13 of each filtration unit 8 is separated from an inner filter chamber 14 by means of a middle screen grid 9, while the inner filter chamber 14 is separated from an innermost filtered water chamber 15 by means of an innermost screen grid 9. As illustrated in FIG. 5, three retention plates 46 extend downwardly from the top housing panel 4 in spaced-apart relationship to each other, and each of the screen grids 9 is mounted on a corresponding one of the retention plates 46 to define the outer filter chamber 13 and the inner filter chamber 14, respectively. As hereinafter further described, the outer filter chamber 13 contains a selected outer filter medium 13a, such as coal, for example, and the inner filter chamber 14 contains a selected inner filter medium 14a, such as, for example, sand. It will be appreciated by those skilled in the art that the outer filter chamber 13 and the inner filter chamber 14 can be any desired size to contain any desired volume of any selected filter medium, including sand, coal, or the like, in non-exclusive particular, by varying the relative spacing of the adjacent screen grids 9 with respect to each other, depending on the degree of filtration desired for the outer filter chamber 13 and the inner filter chamber 14, respectively. Each of the screen grids 9 is designed to contain the selected particulate outer filter medium 13a or inner filter medium 14a in the outer filter chamber 13 or inner filter chamber 14, respectively, of each filtration unit 8. Accordingly, as illustrated in FIG. 3, each screen grid 9 typically includes a sieve screen 11, sandwiched between a pair of expanded metal screens 10. The screen openings 11a of each sieve screen 11 are smaller in size than the particles of the outer filter medium 13a or inner filter medium 14a, respectively, to prevent inadvertent movement of the outer filter medium 13a and inner filter medium 14a beyond the confines of the outer filter chamber 13 and the inner filter chamber 14, respectively. As further illustrated in FIG. 5, an air space 47 is defined between the bottom surface of the top housing panel 4 and the outer filter medium 13a and the inner filter medium 14b, in the outer filter chamber 13 and the inner filter chamber 14, respectively, to compensate for media expansion during filter backwash. As illustrated in FIGS. 1 and 5, top chamber access openings 4a are typically provided in the top housing panel 4, and bottom chamber access openings 5a are typically provided in the bottom housing panel 5, for accessing the outer filter chamber 13 and the inner filter chamber 14, respectively, of each filtration unit 8, as necessary, to change or add outer filter medium 13a and/or inner filter medium 14a, respectively. The top chamber access openings 4a and bottom chamber access openings 5a can be closed typically by means of threaded removable or pivoting opening caps 7.

Referring again to FIG. 5 of the drawings, the filtered water chamber 15 of each filtration unit 8 communicates with a pump chamber 16, defined by a pump housing 23 provided at substantially the center of the housing 2. The pump housing 23 is typically defined by pump housing pipe 22a which extends upwardly from a pump housing bottom 22b, and multiple housing openings 22c establish communication between the pump chamber 16 and the respective filtered water chambers 15. A water pump 24, the purpose of which will be hereinafter described, is provided in the bottom of the pump chamber 16. The bottom housing filter panel 5 extends outwardly from the central pump housing 23 and typically terminates at the raw water chamber 17 portion of each filtration unit 8, to define between the outer wall 3 and the outer edge of the bottom housing panel 5, an intake space 17a which establishes communication between the outside of the housing 2 and the raw water chamber 17. In another embodiment (not illustrated), the bottom housing filter panel 5 extends from the pump housing 23 and is attached to the inside surface of the outer wall 3 to close the bottom of the respective raw water chambers 17, and multiple intake openings (not illustrated) extend through the bottom housing panel 5 at the raw water chambers 17. The pump housing 23 extends upwardly through the top housing panel 4 of the housing 2 and communicates with the filtered water chambers 15 and the pump chamber 16, and is typically closed by a removable cap 30. A filtered water discharge tube 26, provided in fluid communication with the water pump 24, extends upwardly from the water pump 24 and through an air-sealed opening (not illustrated) provided in the cap 30, and is typically fitted with a discharge valve 27 for selectively opening and closing the filtered water discharge tube 26. A T-shaped air introduction tube 31, fitted with an air supply valve 34 and having a lower arm 31a which extends downwardly through an air-sealed opening (not illustrated) in the cap 30 and an upwardly-extending upper arm 31b typically fitted with a main vent valve 33, is connected to a source of compressed air (not illustrated) for selectively introducing pressurized air into the housing 2 for purposes hereinafter described. A housing flotation collar 20, typically constructed of an expanded foam material such as STYROFOAM (trademark) or other suitable buoyant material, or alternatively, having an inner flotation chamber (not illustrated), may be mounted on the housing 2 to impart buoyancy to the underwater filtration operator 1 in a water body 43, as hereinafter described. As further illustrated in FIG. 5, a disinfectant tube or manifold 40 typically extends downwardly through the top housing panel 4, into the raw water chamber 17 of one or more of the filtration units 8 to facilitate introducing a chemical disinfectant such as chlorine into the raw water chamber 17, typically through a valve 41 provided in the disinfectant tube or manifold 40, as deemed necessary. An air vent tube 37 further extends through the top housing panel 4 and into the raw water chamber 17 of each of the filtration units 8 to facilitate releasing pressurized air from the housing 2 typically through an air vent valve 38 provided in each air vent tube 37, as hereinafter described.

Referring now to FIGS. 5, 7 and 8 of the drawings, in typical operation of the underwater filtration operator 1, the filtered water discharge tube 26 is connected to a suitable water collection container or dispenser (not illustrated) and the air introduction tube 31 is connected to a source of pressurized air (not illustrated). With both the main vent valve 33 in the upper arm 31b of the air introduction tube 31 and the air vent valves 38 of the respective air vent tubes 37 in the closed position, the housing 2 is placed on the water body 43 such that the housing 2 initially floats on the water body 43, due to air trapped between the surface of the water body 43 and the top housing panel 4 inside the housing 2. The main vent valve 33 and the air vent valves 38 are next opened to facilitate escape of air from the housing 2 through the respective lower arm 31a and upper arm 31b of the air introduction tube 31 and the air vent tubes 37, which escape of air from the housing 2 causes the housing 2 to slowly descend into the water body 43. The housing 2 is finally suspended just beneath the surface of the water body 43, as illustrated, typically by means of buoyancy imparted to the housing 2 by means of the flotation collar 20. As the housing 2 descends into the water body 43, raw water from the water body 43 is drawn first into the raw water chamber 17 of each filtration unit 8 through the respective raw water intake openings 80a in the bottom 80 (FIGS. 7 and 8) of the housing 2 and into the intake spaces 17a, and then through the outer screen grid 9, the outer filter medium 13a, the middle screen grid 9, the inner filter medium 14a, and finally, through the inner screen grid 9 of the corresponding filtration unit 8, into the filtered water chamber 15. After the housing 2 reaches the final suspension level in the water body 43, the main vent valve 33, the air supply valve 34 and the air vent valves 38 are closed, and the water pump 24 is then operated to pump the filtered water upwardly through the filtered water discharge tube 26 and the open discharge valve 27, and finally, into the filtered water collection tank or dispenser or further treatment facility (not illustrated). Continued operation of the water pump 24 facilitates continuous flow of the water from the water body 43, into the raw water chamber 17 and through the outer filter medium 13a, the inner filter medium 14a, the filtered water chamber 15, into the pump housing 26 and is then pumped by the water pump 24 through the filtered water discharge tube 26 and into the water collection container or dispenser or treatment facility, respectively. As the water is drawn through the outer filter chamber 13 and the inner filter chamber 14, respectively, the outer filter medium 13a and the inner filter medium 14a remove both large and small particulate impurities, as well as some bacteria and microorganisms, from the water. It will be appreciated by those skilled in the art that as the water flows through the filtration units 8 and is pumped through the filtered water discharge tube 26 into the water collection tank, dispenser, or water treatment facility, chlorine or other disinfectant chemicals can be introduced into the pre-filtered water through the disinfectant tube or manifold 40 by opening the disinfectant valve 41, to kill bacteria, algae and other microorganisms and ensure filtered water containing few or no live bacteria, algae or microorganisms which may otherwise evade the filtering process. The outer filter medium 13a and the inner filter medium 14a can be removed from the outer filter chamber 13 and the inner filter chamber 14, respectively, and replaced with fresh or alternative filter medium, as deemed necessary, by accessing the outer filter chamber 13 and the inner filter chamber 14, respectively, through the top chamber access openings 4a and the bottom chamber access openings 5a, after removing the opening caps 7, as described above.

Figure 9:
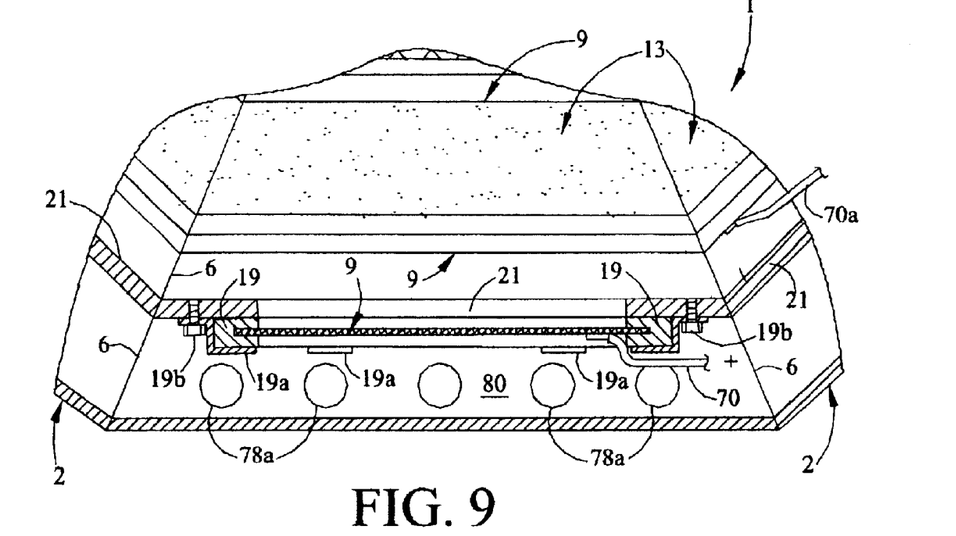
FIG. 9 is a sectional view of the positively charged water inlet screen illustrated in FIG. 8.
Figure 10:
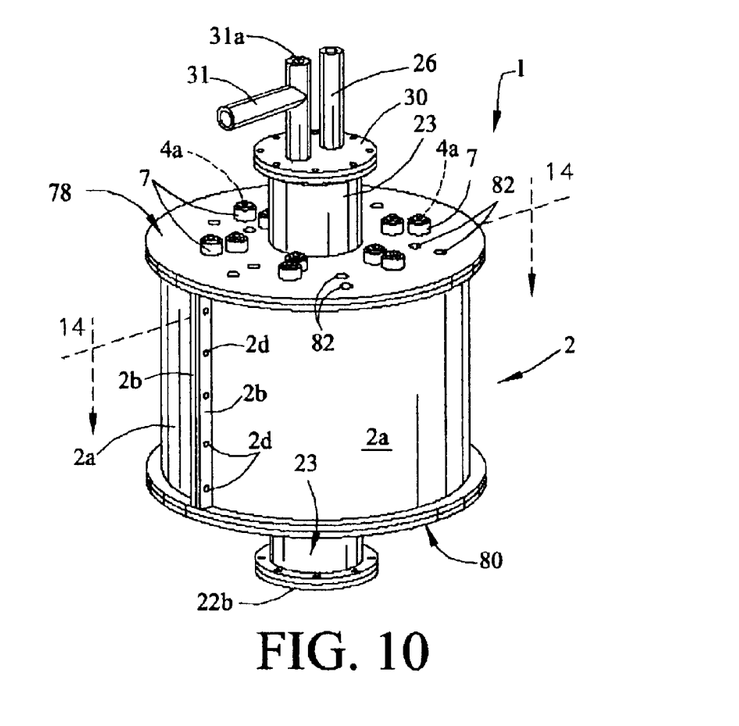
FIG. 10 is a perspective view of an alternative electrically charged filter screen embodiment of the filter operator illustrated in FIG. 6.

As illustrated in FIGS. 7–9, in another embodiment of the invention the water filtration system 1 includes a housing 2, designed as illustrated in FIGS. 1–5 and fitted with multiple screen grids 9, each typically mounted inside the housing 2 on a panel 21, having an opening (not illustrated) circumscribed by a screen frame 19, frame brackets 19a and bracket bolts 19b. At least one of the water screen grids 9 is positively charged with electricity by means of a positive lead 70 that connects to battery charger or battery 69, for reasons more particularly hereinafter set forth. As illustrated in FIG. 9, grid insulation is provided by the insulated screen frame 19 on one or all of the screen grids 9, to electrically isolate and insulate the screen frame 19 and the screen grids 9 from the remainder of the water filtration system 1, for purposes which will be hereinafter discussed.

Figure 13:
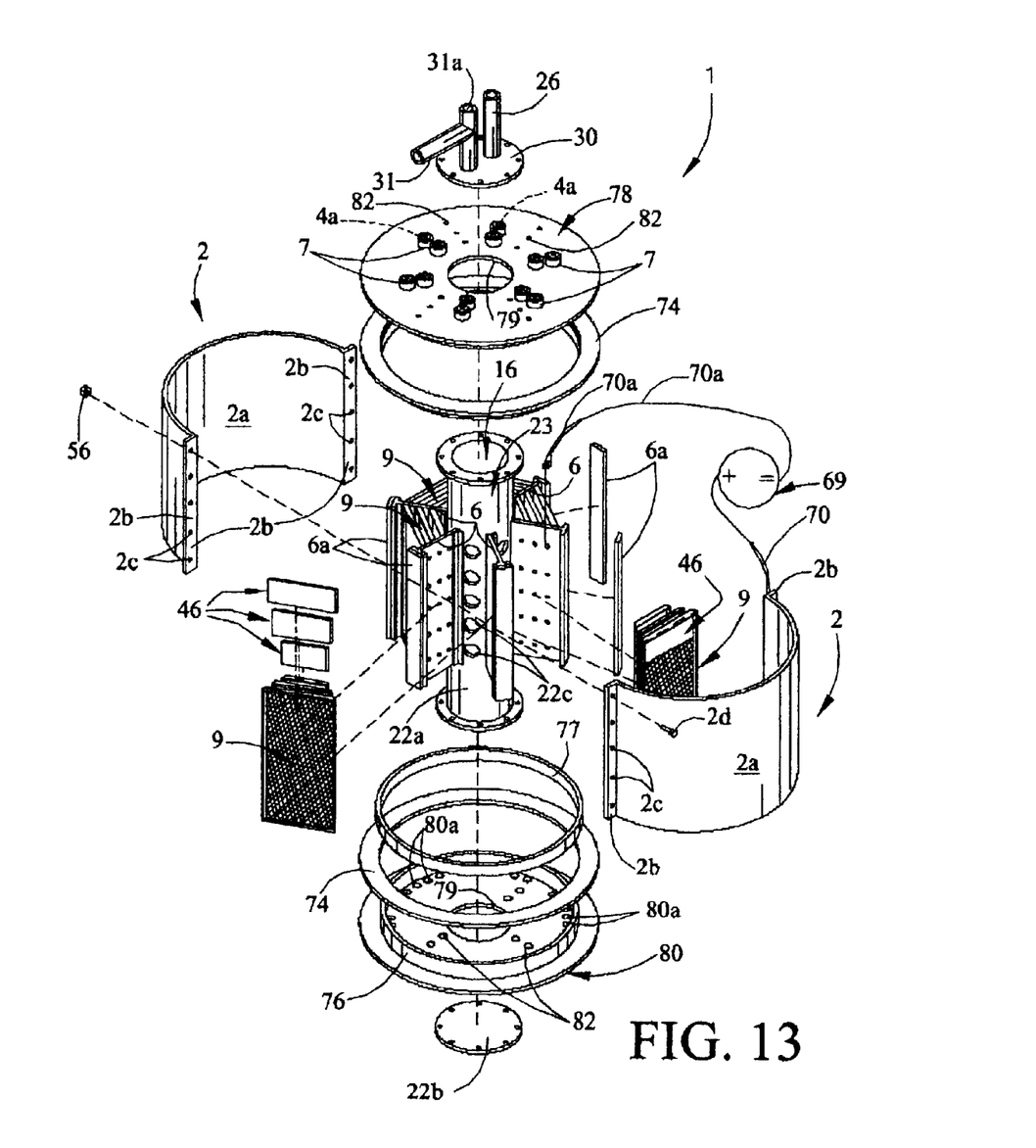
FIG. 13 is an exploded view of the filter operator illustrated in FIG. 10.
Figure 14:
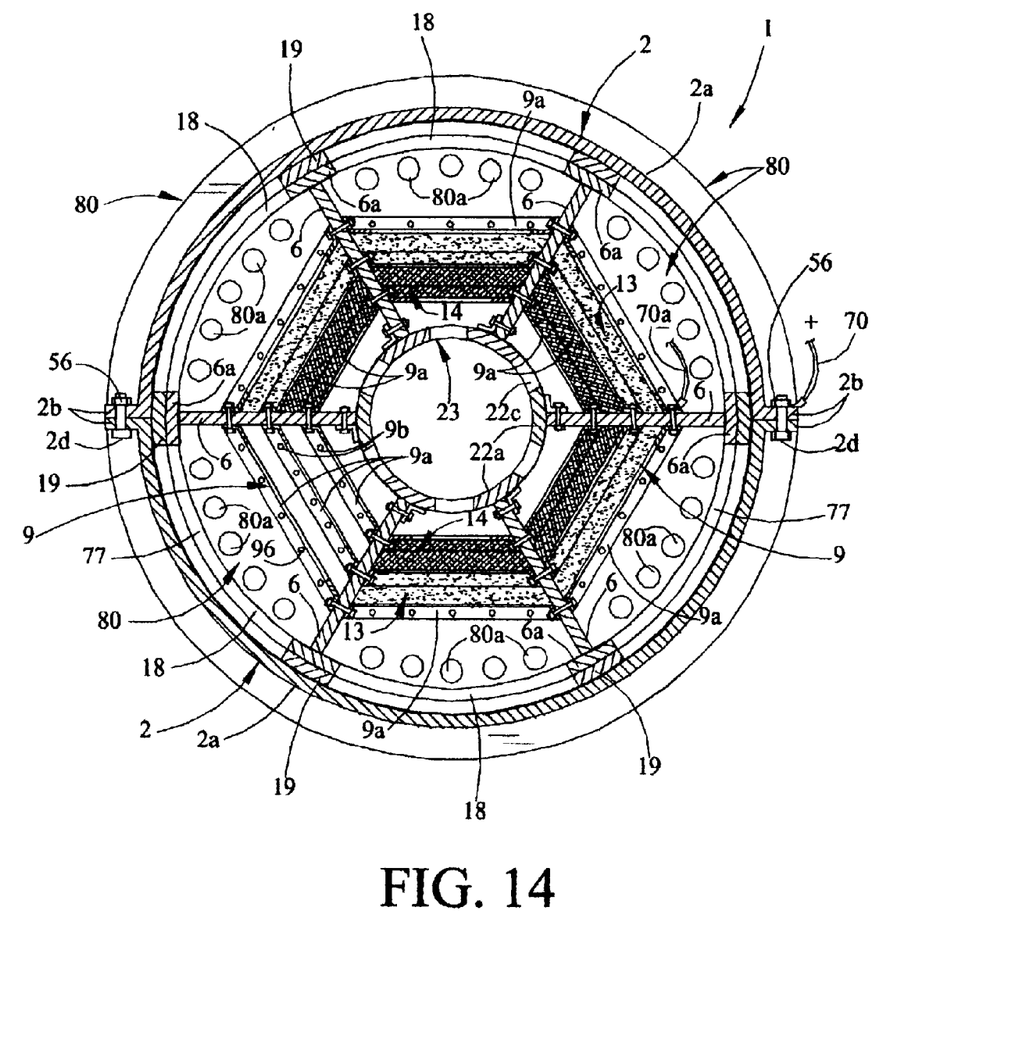
FIG. 14 is a sectional view of the filter operator taken along line 14—14 in FIG. 10.

In still another embodiment of the invention illustrated in FIGS. 10–14 of the drawings, the water filtration system 1 includes a cylindrically-shaped housing 2, which is characterized by a pair of semi-cylindrically-shaped plates 2a, each having longitudinal flanges 2b, with spaced-apart flange openings 2c (FIG. 13) for bolting together using flange bolts 2d and nuts 56, to enclose the respective partitions 6, filtration units 8 and screen grids 9, as illustrated. Retention plates 46 cover the tops of the respective screen grids 9 to define air spaces (not illustrated) above the screen grids 9, in the same manner as the air spaces 47, illustrated in FIG. 5. In all other respects, regarding heretofore disclosed elements such as the air introduction tube 31 and disinfectant tube or manifold 40, the pump housing 23 and water pump 24, illustrated in FIG. 4, as well as the other mechanical details illustrated in FIGS. 1–6 of the drawings, the water filtration system 1 illustrated in FIGS. 10–14 incorporates the same elements and operating components. In a most preferred embodiment of the invention, and as illustrated in FIG. 14, the screen grids 9 are typically characterized by segments of angle iron 9a, the horizontal flanges of which are provided with angle iron holes 9b, for bolting to a cover 78 and a bottom 80, both having a donut opening 79, on the angle iron 9a, using cover bolts 82, as further illustrated in FIGS. 10–13. The partitions 6 are fitted with water screen grids 9, respectively, for receiving raw water from the water body 43 to be filtered as that water is channeled from the water body 43, through the respective raw water inlet openings 80a and the water screen grids 9, and then through the outer filter chamber 13 and inner filter chamber 14 and through the outer filter medium 13a and inner filter medium 14a, respectively, as heretofore described with respect to the water filtration system 1 illustrated in FIGS. 1–9.

Figures 11, 12:
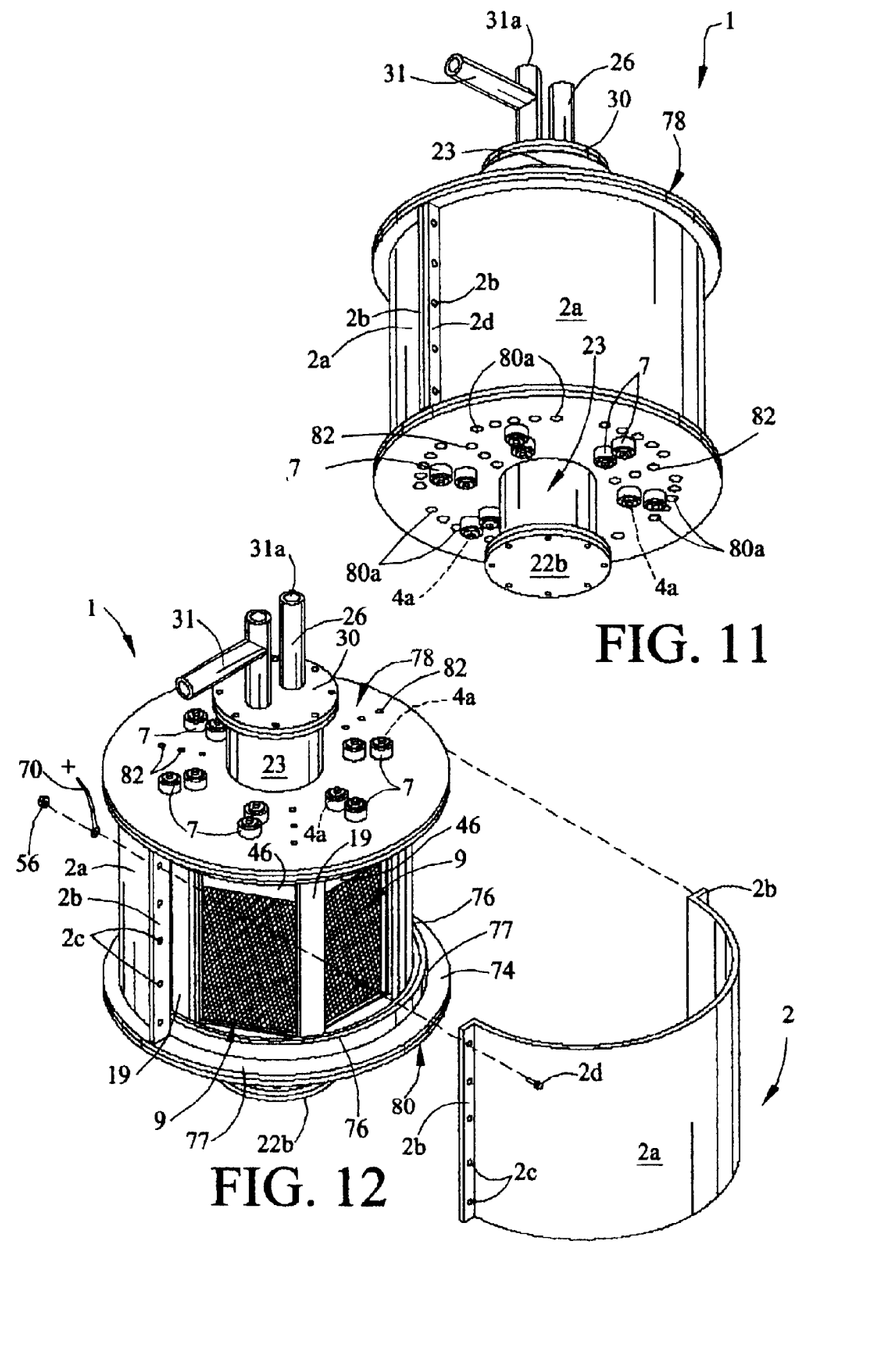
FIG. 11 is a bottom perspective view of the filter operator illustrated in FIG. 10.
FIG. 12 is a perspective view, partially in section, of the filter operator illustrated in FIG. 10 with a housing plate removed to show a typical positively charged housing and water inlet screen configuration.

As further illustrated in FIGS. 12–14, in a typical assembly of this embodiment of the water filtration system 1 a pair of round tank flanges 76 are extended around the projecting top and bottom segments or ends of the partition plates 6a, capping the projecting edges of the radially-extending partitions 6, a pair of insulation rings 74 is added to the tank flanges 76 and the tank flanges 76 are then welded to the cover 78 and the bottom 80, respectively. Furthermore, both the cover 78 and the bottom 80 are bolted to the underlying horizontal flanges (FIG. 14) of the respective angle iron segments 9a, which serve to mount the screen grids 9, using the cover bolts 82. Each donut opening 79 in the cover 78 and the bottom 80 accommodates the pump housing 23 in the housing 2, as in the case of the embodiments illustrated in FIGS. 1–9 of the drawings, as well as the filter water discharge tube 26, water pump 24 and filtered water chamber 15, as shown in FIG. 5 and as described above with respect to FIGS. 1–6 of the drawings. A flange insulation gasket 77 is extended around each tank flange 76 at the top and bottom of the housing 2, as further illustrated in FIG. 13, to facilitate insulating the semi-cylindrical housing plates 2a from the inside screen grids 9. Furthermore, as further illustrated in FIGS. 12 and 13, the positive lead 70 of a battery or a battery charger 69 can be attached to the housing plates 2a, while the negative lead 70a of the battery or the battery charger 69 is attached to a partition 6, to facilitate applying an electrical potential to the outer filter medium 13a and the inner filter medium 14a and the screen grids 9. Accordingly, in both of the embodiments illustrated in FIGS. 7–9 and 10–13, since raw water flowing from the water body 43 into the interior of the water filtration system 1 through the raw water intake openings 80a and the screen grids 9 contains negatively charged particles as impurities, these particles are neutralized as they contact the charged raw screen grids 9 and are therefore more effectively and efficiently filtered through the outer filter medium 13a and the inner filter medium 14a. Consequently, neutralizing of the incoming particles of sand, grit, clay and the like in the raw intake water, prevents these particles from being repelled by each other and facilitates a more effective filtration and coalescing of the particles together in the outer filter medium 13a and the inner filter medium 14a. The result of the more efficient filtration is exceptionally clear water which enters the filtered water chamber 15 and is pumped by means of the water pump 24 from the pump housing 22 of the water filtration system 1 to storage, use or to an additional water treatment filter unit, such as a reverse osmosis unit, as desired.

Referring again to FIGS. 7–10 of the drawings in this embodiment of the invention the water filtration system 1 is constructed essentially as described above with respect to FIG. 7, and is also preferably constructed of a frame of angle iron (not illustrated) and bolted to the cover 78 and the bottom 80 (FIG. 10) in the same manner as the water filtration system 1 illustrated in FIGS. 10–13. However, the positive lead 70 of the battery charger or battery 69 is connected directly to one or more of the screen grids 9, while the negative lead 70a is typically connected to a partition 6. Accordingly, negatively charged impurities such as sand, grit, clay and the like particles flowing through the screen grids 9 in the raw water are effectively neutralized as described above, to facilitate more complete and efficient filtering of these particles from the water as it passes through the outer filter medium 13a and the inner filter medium 14a.

It will be appreciated by those skilled in the art that in all of the embodiments detailed herein, the underwater filtration operator 1 can be selectively operated in a backwash cycle to remove impurities, filtered from the water, from the outer filter medium 13a and the inner filter medium 14a, respectively, by reversing the direction of water flow through the respective filtration units 8. This is accomplished by initially terminating operation of the water pump 24 and the battery charger 69; closing the main vent valve 33; opening the air vent valves 38 of the respective air vent tubes 37; and pumping air into the filtered water chamber 15 from the source of compressed air (not illustrated), through the air introduction tube 31 and lower arm 31a of the air introduction tube 31 by opening the air supply valve 34. This action forces filtered water in the filtered water chamber 15, through the inner filter medium 14a in the inner filter chamber 14 and the outer filter medium 13a in the outer filter chamber 13, respectively, and into the raw water chamber 17 of each corresponding filtration unit 8. This reverse flow of water through the inner filter medium 14a and the outer filter medium 13a, respectively, of each filtration unit 8, in combination with pressurized air discharged from the air introduction tube 31 into the filtered water in the filtered water chamber 15, removes all or most of the filtered particles and some microorganisms from the inner filter medium 14a and the outer filter medium 13a of each filtration unit 8, and directs these impurities into the water body 43 through the intake spaces 17a. Furthermore, when the air is forced through the inner filter medium 14a and the outer filter medium 13a, the air space 47 in each inner filter chamber 14 and outer filter chamber 13 enables the inner filter medium 14a and the outer filter medium 13a to expand and fill the entire volume of the respective inner filter chamber 14 and outer filter chamber 13. Accordingly, the inner filter medium 14a and outer filter medium 13a become fluid in the inner filter chamber 14 and the outer filter chamber 13, respectively, and this facilitates thorough cleansing of the inner filter medium 14a and outer filter medium 13a.

Referring again to FIG. 5 of the drawings, it will be appreciated by those skilled in the art that the flotation collar 20 is particularly suitable for suspending the housing 2 beneath the surface of the water body 43 under circumstances in which the level of the water body 43 is subject to fluctuating water levels. Alternatively, it is understood that the housing 2 can be positioned beneath the surface of the water body 43 by securing the housing 2 to a dock, barge, piling or the like. It will be further appreciated by those skilled in the art that the controls for the filtered water discharge valve 27, the main vent valve 33, the air supply valve 34, the air vent valves 38 and the disinfectant valve 41, respectively, may be provided in a land-based control panel (not illustrated) for convenient, expedient and/or automated operation of the underwater filtration operator 1. Furthermore, it is also understood that any source of direct electric current, in addition to a battery charger can be used to supply the desired potential across the filter media.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. An underwater filtration operator for filtering water in a water body, comprising:
    a housing;
    a plurality of filtration units provided in said housing;
    at least two filters provided in radially adjacent relationship with respect to each other in said plurality of filtration unit, respectively, for receiving the water from the water body;
    a puma chamber provided in said housing for receiving the water from said plurality of filtration units, respectively; and
    a water pump provided in said pump chamber for pumping the water from the water body into said housing, through said filtration units and said filters and into said pump chamber.

2. The underwater filtration operator of claim 1 comprising a housing flotation collar provided on said housing for floating said housing in the water body.

3. The underwater filtration operator of claim 1 comprising at least one water inlet screen grid provided in said housing for receiving water from the water body and wherein said water inlet screen grid is charged with electricity.

4. The underwater filtration operator of claim 3 wherein at least one of said filters comprises a sand filter.

5. The underwater filtration operator of claim 3 comprising a housing flotation collar provided on said housing for floating said housing in the water body.

6. The underwater filtration operator of claim 1 comprising a raw water chamber provided in said housing for receiving the raw water from the water body.

7. The underwater filtration operator of claim 6 wherein at least one of said filters comprises at least one pair of water inlet screen grids provided in radially spaced-apart relationship with respect to each other and filter medium disposed between said water inlet screen grids in said plurality of filtration units, respectively.

8. The underwater filtration operator of claim 7 wherein said at least one of said water inlet screen grids is charged with electricity.

9. The underwater filtration operator of claim 8 comprising a housing flotation collar provided on said housing for floating said housing in the water body.

10. The underwater filtration operator of claim 8 wherein a first one of said water inlet screen grids encloses a sand filter and a second one of said water inlet screen grids encloses a charcoal filter provided in said radially adjacent relationship with respect to said sand filter in said plurality of filtration units, respectively.

11. The underwater filtration operator of claim 10 comprising a housing flotation collar provided on said housing for floating said housing in the water body.

12. The underwater filtration operator of claim 6 wherein said filters comprise a sand filter and a charcoal filter, respectively.

13. The underwater filtration operator of claim 1 wherein said filters comprise a sand filter and a charcoal filter provided in said radially adjacent relationship with respect to each other in said plurality of filtration units, respectively.

14. An underwater filtration operator for filtering water in a water body, comprising:
    a housing charged with electricity;
    a plurality of filtration units provided in said housing;
    a pair of filters provided in radially adjacent relationship with respect to each other in said plurality of filtration unit, respectively,
    a pump chamber provided in said housing for receiving the water from said plurality of filtration units and said filters, respectively; and
    a water pump provided in said pump chamber for pumping the water from the water body into said housing, through said filtration units and said filters and into said pump chamber.

15. The underwater filtration operator of claim 14 comprising a source of compressed air provided in pneumatic communication with said pump chamber for selectively introducing compressed air into said pump chamber and forcing the water from said pump chamber, through said filters and into the water body and cleaning said filters.

16. An underwater filtration operator for filtering water in a water body comprising:
    a housing charged with a positive charge of electricity;
    a plurality of filtration units provided in said housing, with at least one of said filtration units charged with electricity;
    at least one pair of filters provided in said plurality of filtration units, in radially adjacent relationship with respect to each other, respectively, for receiving the water from the water body;
    a pump chamber provided in said housing for receiving the water from said plurality of filtration units, respectively;
    a water pump provided in said pump chamber for pumping the water from said housing through said filtration unit and said filters and into said pump chamber;
    a source of compressed air provided in pneumatic communication with said pump chamber for selectively introducing compressed air into said pump chamber and forcing the water from said pump chamber through said filters and into the water body and cleaning said filters; and
    a disinfectant manifold extending into said housing for introducing disinfectant into the water in said housing.

* * * * *